Figure 1:
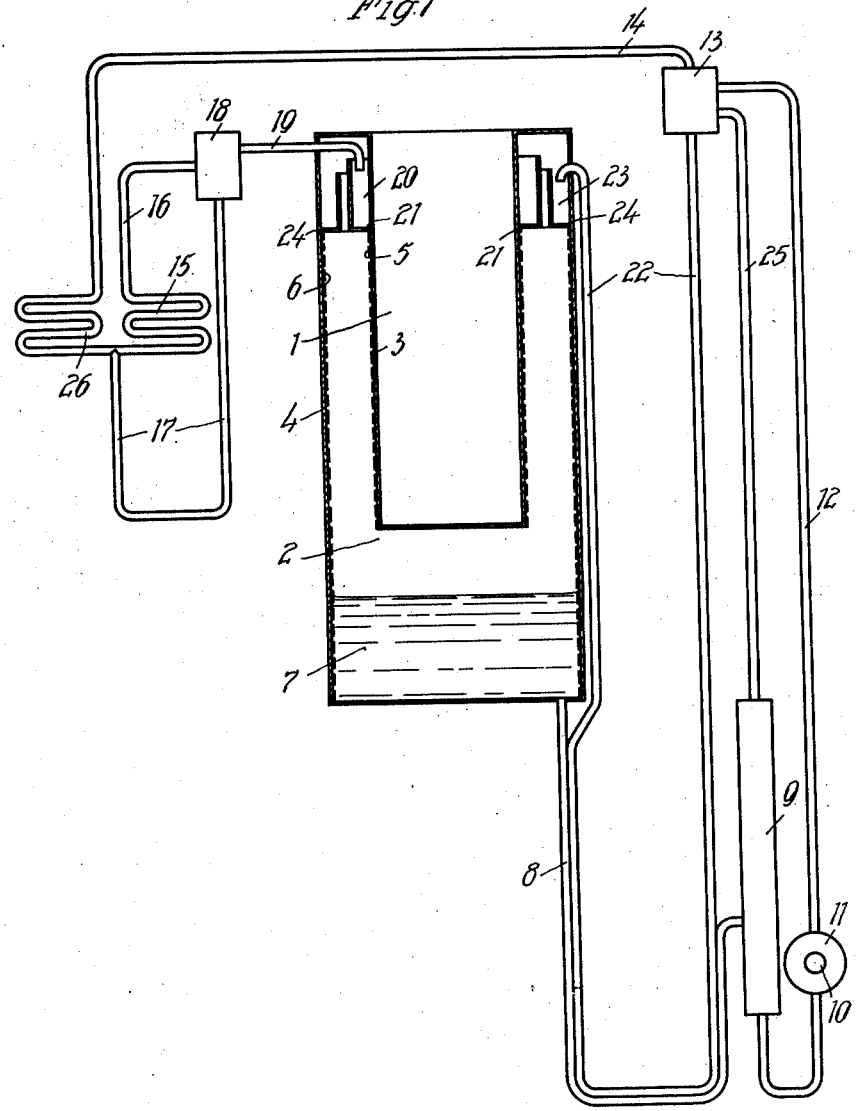

June 13, 1933.   E. ALTENKIRCH   1,913,468
ARRANGEMENT FOR REDUCING THE TRANSMISSION OF HEAT
Filed Dec. 11, 1930   2 Sheets-Sheet 1

Inventor
Edmund Altenkirch
By. Harry S. Dumares
Atty.

Patented June 13, 1933

1,913,468

UNITED STATES PATENT OFFICE

EDMUND ALTENKIRCH, OF NEUENHAGEN NEAR BERLIN, GERMANY, ASSIGNOR, BY MESNE ASSIGNMENTS, TO THE HOOVER COMPANY, OF NORTH CANTON, OHIO, A CORPORATION OF OHIO

ARRANGEMENT FOR REDUCING THE TRANSMISSION OF HEAT

Application filed December 11, 1930, Serial No. 501,513, and in Germany January 9, 1930.

This invention relates to absorption refrigerating apparatus and more particularly to means for reducing the transmission of heat between hot and cold portions of such a system.

It is often desirable to keep the transmission of heat between two bodies having different temperatures as low as possible. This is desirable, for example, in maintaining low temperatures produced by a refrigerating apparatus. Heat insulators of various types are generally used for this purpose. Gases and particularly heavy gases have good heat insulating properties but even these conduct considerable heat particularly when gas currents form and some heat is transmitted by convection.

It is an object of the present invention to reduce the transmission of heat between two bodies having different temperatures by making use of the properties of a refrigerant which may be evaporated from a surface of the cold body and absorbed by an absorption solution on the surface of a warmer body.

According to my invention, the said object is achieved by the two spaces of different temperatures being separated from each other by two walls enclosing an intermediate space, the latter being hermetically sealed by the two walls.

The sides of the walls facing the intermediate space, form on the one wall the evaporation surface and on the other the absorption surface for the working medium or refrigerant of a continuously working absorption machine. It is advisable to give the walls enclosing the intermediate space a sufficient inclination with respect to the horizontal plane so that the evaporizing or absorbing liquid may trickle down on same.

Furthermore an indifferent or inert gas may be admixed to the gaseous working medium in the intermediate space enclosed by the walls, so that the crossing of the working medium from the evaporation surface to the absorption surface takes place through diffusion. This is particularly advantageous if one or both of the outer sides of the walls enclosing the intermediate space are in contact with the air. In this case the intensity of the transmission of heat from the evaporation or the absorption surface towards the side in contact wtih the air, or vice versa, is comparatively small in comparison to the intensity of the cold or the heat produced by the evaporation of the absorption. It would of course also be possible to adapt accurately the concentration of the working medium in the absorption solution to the desired or given temperature of the two walls and by so doing avoid the admixture of an indifferent gas. The device would, however, thereby become very sensitive to temperature. By employing an indifferent gas, one has the possibility of adapting the intensity of the heat transmission to the intensity of the cold produced through the evaporation or to that of the heat produced through the absorption. At the same time, the conditions may be so chosen that the total pressure in the intermediate space assumes any predetermined value, for instance that of the atmospheric pressure. The admixture of any indifferent gas in the intermediate space between the walls results in undesirable currents of gas, which carry heat from one wall to the other. To prevent this convection of heat or at least to reduce it considerably, it is possible, according to the further improvement, to add to the working medium vapor an indifferent gas or gas mixture having a higher molecular weight, in such quantities that the gas currents in the intermediate space are reduced to a minimum.

If the total pressure which is to be maintained is predetermined, the same object can be obtained by adding an indifferent gas or gas mixture, the molecular weight of which is so much heavier compared to the molecular weight of the working medium that gas currents in the intermediate space are reduced to a minimum.

If we call the evaporation and absorption surfaces of the walls enclosing the intermediate space active surfaces, then we may say that with the arrangement according to the invention in each case one of the two walls is with its non-active side, contiguous to a space which is to be warm or cold. The idea common to all constructions based upon the invention may be expressed by saying that in each case a warmer space is separated from a colder space by a hollow space enclosed by the two active surfaces. This separation need not be a complete one, it being possible for a part of the separating walls to consist of heat insulating materials of the usual kind.

Figure 2:
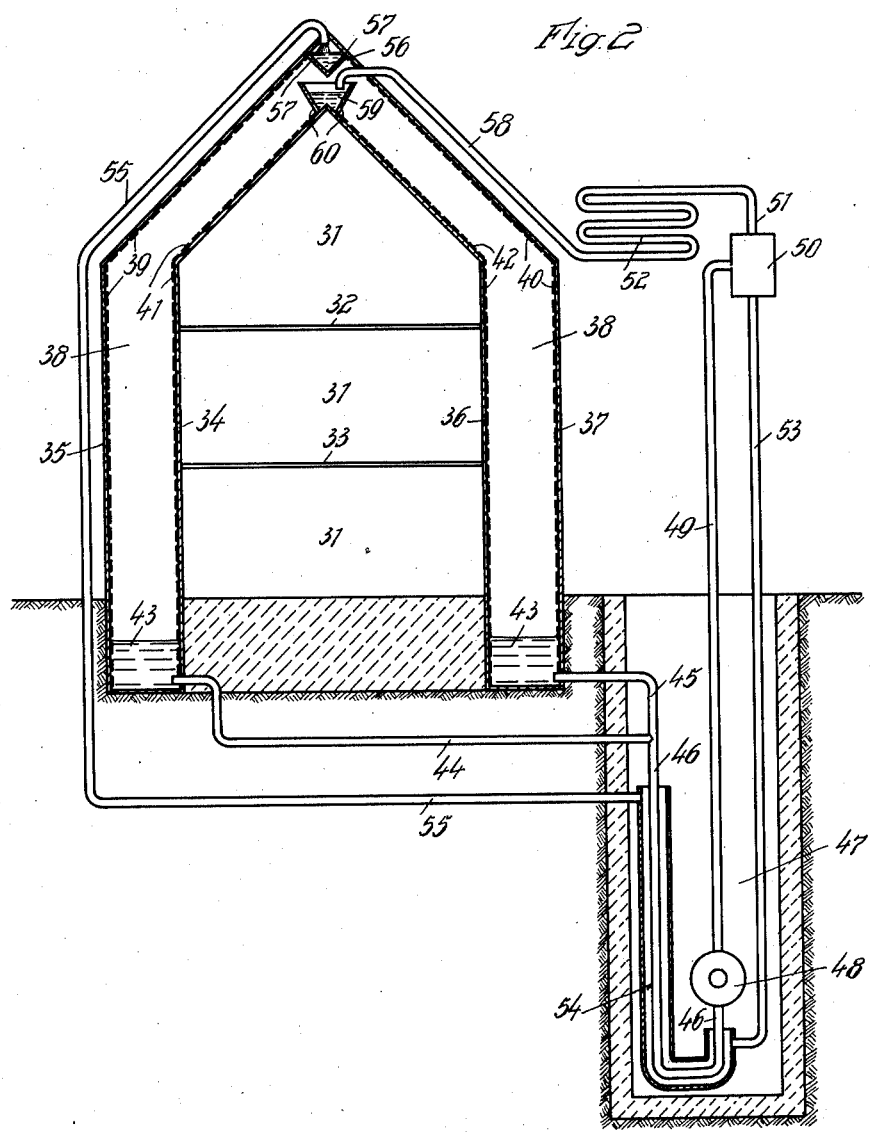

In the drawings, Fig. 1 is a diagrammatic showing of a refrigerating apparatus embodying one form of the present invention and in which certain parts are shown in cross-section, and Fig. 2 is a similar diagrammatic representation of another modification thereof.

In Fig 1 of the drawings, an example of the invention is schematically illustrated, in which the walls enclosing the intermediate space surround a space to be cooled, for instance, the cooling chamber of a refrigerator, and in which only air is used for cooling the parts of the continuously working absorption machine giving up heat. The vessel with a double wall enclosing the cooling chamber 1 has, the same as the cooling chamber itself, substantially a cylindrical form. The upright wall contiguous to the cooling chamber is at a comparatively small distance opposite the likewise upright wall 4 contiguous to the surroundings. The wall 4 however extends further down than the wall 3. The whole of the two walls are covered with some kind of distributing structure 5 and 6 over which liquid entering at the top may trickle. These distributing structures may be made of a porous material, or they may be produced by arranging in the walls horizontal grooves hollowed out towards the bottom, the grooves being connected with one another by overflows. In the lower part of the double walled vessel under the bottom 2 of the cooling chamber, which is open at the top, is a stock of liquid 7. From the bottom of the part of the vessel containing the stock of liquid 7 a U-shaped liquid-pipe 8 leads to an equalizing container 9 and from the latter to a generator vessel 11 which may be heated by a heating element 10. The generator 11 is connected by means of an upwardly extending pipe 12 to a gas separation chamber 13, which is connected through a gas pipe 14 provided at its lower end with a few coils 22, to the likewise coil-shaped condenser 15 in the manner shown in the drawings. The condenser 15 is connected through an upper pipe 16 and a lower U-shaped pipe 17 to an equalizing container 18, so as to form a closed circulating circuit. From the equalizing container 18, the condensate is conveyed by a pipe 19 passing through the outer wall 4 of the double walled vessel, into an annular space 20 encircling the inner wall 3 in the upper part of the double walled vessel. The bottom of the annular space 20 is at its edge close to the wall 3 of the vessel provided with a number of holes 21, through which the condensate can pass onto the distributing structure 5.

From the gas separation chamber 13 a U-shaped liquid pipe 22, forming a temperature interchanger with the liquid pipe 8 and passing through the outer wall 4 of the double-walled vessel, leads to an annular space 23 provided in the hollow space at the top of said vessel at the side of the wall 4. At its edge close to the wall 4 of the vessel, the bottom of the space 23 is provided with a number of holes 24 allowing the absorption solution to pass onto the distributing structure 6. The solution trickling over the distributing structure 6, and thereby becoming more and more enriched by absorbing working medium vapor, gathers in the liquid stock 7 at the bottom part of the double-walled vessel. The hollow space of this vessel not filled with liquid contains an indifferent gas, for instance, air or a heavy gas in such quantities that the difference of pressure between the evaporating and the condensing working medium is equalized with the exception of a small remainder of pressure which is maintained by the liquid columns, formed on the one hand by the condensate in the condenser 15 and the pipe 16, and on the other hand by the rich solution contained between the level of the stock of liquid 7 and the level of the absorption solution in the equalizing vessel 9. From the gas-containing space above the surface of the liquid in vessel 9, a pipe 25 leads into the gas separation chamber 13; said pipe 25 having the object of conveying into the gas separation chamber 13 and through same to the condenser 15 any gas gathering in the vessel 9.

When the heating element 10 is joined up to a current source, gas bubbles are developed from the absorption solution in the generator 11 and rise together with the weak solution in the upwardly extending pipe 12 into the gas separation chamber 13. Here the gaseous working medium separates itself from the solution. Through the pipe 14 it is conveyed to condenser 15. The condensate passes through the equalizing vessel 18 and the pipe 19 into the space 20 and from here through the openings 21 onto the distribution structure 15, covering the inner side of the wall 3 contiguous to the cooling chamber 1. Whilst trickling down this wall the condensate evaporates and diffuses into the admixed indifferent gas.

The weak absorption solution deprived of the gaseous working medium flows through the liquid pipe 22 into the space 23 and from there through the openings 24 onto the distributing structure 6 covering the inner side of the wall 4 of the double walled vessel contiguous to the surroundings. In trickling down this wall, the absorption liquid absorbs the working medium from the mixture of gaseous working medium and indifferent gas, enriching itself thereby more and more and finally forming the liquid stock 7 at the bottom of the vessel. Through the liquid pipes 8 and equalizing container 9, the rich absorption solution then returns to the generator 11. The dimensions of the cylindrical wall 3 surrounding the cooling chamber 1, and on the outer side of which the evaporation of the working medium takes place, and those of wall 4 contiguous to the surroundings and opposite to wall 3 and on the inner side of which the absorption of the evaporated working medium takes place, are so chosen that at a certain temperature of the cooling chamber and a certain temperature of the surroundings, a state of equilibrium exists between the quantities of heat taken and given up. As long as this state of equilibrium can be maintained to a certain degree, the double-walled vessel represents means for separating the two chambers from each other and makes any employment of ordinary heat insulation means unnecessary, since it almost entirely prevents the transmission of heat between the two chambers of different temperatures.

If this state of equilibrium is disturbed owing to variations in temperature in the surroundings, the transmission of heat between the two chambers of different temperatures can, it is true, not be altogether prevented but it can at least be reduced much more than would be possible with any previously known heat insulating means.

For the working medium and the neutral gas, the most different media may be chosen. In some cases it is, however, particularly favourable to choose these media so that the total pressure in the hollow space of the double walled vessel, i. e. particularly in the intermediate space between the absorption surface and the evaporation surface, does not exceed the atmospheric pressure. As this total pressure depends upon the condensation pressure of the working medium at the temperature of the condenser, only a substance evaporating at a mean vaporizing temperature a little below the atmospheric pressure, should be considered as a proper working medium under these conditions. Substances of that kind are, for example, ethylamine, acetaldehyde, ethyl chloride and several others. If on the inner side of the wall 3, instead of condensate, a very concentrated absorption solution is made to trickle down, and if to produce same a reabsorber is used instead of the condenser 15, it is then possible, even if a medium is chosen, the vaporizing pressure of which is in itself higher than the atmospheric pressure, to maintain the atmospheric pressure in the intermediate space between the evaporation surface and the absorption surface. For this purpose aqueous ammonia solution is also particularly suitable. By employing a corresponding quantity of admixed indifferent gas, the total pressure may in each case be very accurately adjusted.

As a rule, the evaporation surface and the absorption surface will be disposed opposite to, and at a comparatively small distance from, each other. It is not necessary for the two surfaces to be arranged vertically. One of the surfaces might, for instance, be placed in a vertical position and the other slanting to that, perhaps in such a manner that the intermediate space becomes somewhat narrower towards the bottom. The latter construction has the advantage that the changes of concentration of the solution are compensated for, so that the partial drop of pressure remains constant. If the distance between the evaporation surface and the absorption surface is made comparatively large, under some circumstances undesirable currents of gas may form in the intermediate space. To diminish these currents it is advisable to add to the working-medium vapor an indifferent gas or gas mixture having a higher molecular weight, the quantity of which being so chosen as to reduce in the intermediate space the creation of currents of gas to a minimum. If the working medium is already chosen and the total pressure in the hollow space of the double walled vessel is also fixed, the same result may be obtained by selecting as an indifferent gas a gas or gas mixture, the molecular weight of which is so much heavier compared to the molecular weight of the working medium, that the currents of gas in the intermediate space become a minimum. It is also possible to arrange in the intermediate space transversely extending insulating partitions placed substantially in a horizontal position in such a manner as to make the formation of currents of gas more difficult, without the diffusion being impaired.

The refrigeration output, which is produced on the evaporation surface and transmitted to the refrigerating chamber may be adjusted to the desired value by choosing accordingly the distance between the evaporation surface and the absorption surface on the one hand, and the total pressure existing in the intermediate space on the other hand. If in so doing a total pressure lower than the atmospheric pressure can be obtained, it is advisable not to equalize completely the difference between the condensing pressure and the vaporizing pressure, by adding indifferent gas, as the efficiency of the plant decreases the more indifferent gas is added. A certain falling-off of the efficiency in plants operating with water cooling of the parts giving up heat in absorption machines, may without troubling be taken into the bargain. Matters are, however, somewhat different when in refrigerators and similar cooling devices the parts giving up heat are to be cooled only by air. In that case it is better to let a part of the said difference of pressure remain and to maintain the same by liquid columns.

In Fig. 2 illustrating a further example of the invention, a cold store or storage building is shown in sectional elevation, the arrangement of which serves according to the invention, to prevent heat penetrating the rooms to be kept cold and in which, for example, ice or provisions are to be stored. As will be seen in the drawings, the cooling or refrigerating space 31 of the cold store, which is in its height subdivided by intermediate floors 32 and 33, is outwardly enclosed by walls 34, 35 and 36, 37 arranged pairwise. The two walls forming each pair of walls are erected parallel to each other. At their lower part the walls stand vertically and at the top they incline and assume the shape of a roof. In the intermediate space 38, enclosed by them is a certain quantity of indifferent gas, for example, air. Each of the walls 34, 35 and 36, 37 is over the whole extent of its side facing the intermediate space covered with a distributing structure 39, 40 and 41, 42, which may consist for example, of a porous material, or also of grooves suitably arranged in the walls and connected with one another. Liquid trickling over the said distributing structures gathers in the lower part of the intermediate space 38 and forms a store of liquid 43. By means of liquid pipes 44, 45 which combine and form a U-shaped pipe 46, the portion of the vessel which holds the liquid 43 is connected with the electrically heatable generator 48, situated in a brickwork pit 47. A gas lift pump conduit 49 connects the generator to a gas separating chamber 50. In the chamber 50 the gas and absorption liquid separates the gas passing through a conduit 51 into the condenser 52. Absorption liquid deprived of gas passes downwardly to conduit 53 and enters the U-shaped conduit 54 which is in heat exchange relation with the conduit 46 mentioned above. The conduit 55 conveys the absorption solution away from the heat exchange conduit 54. The liquid pipe 55 goes up outside the building and opens, at the ridge of the roof formed by the walls 35 and 37, into a trough 56, from which the arriving liquid can pass through lateral openings 57 onto the distributing structures 39 and 40. In a similar manner, the condenser 52 is connected through a liquid pipe 58 with a trough 59 situated on the ridge of the walls 34 and 36 inclined towards each other. From that trough the condensate can flow through holes 60 provided at the bottom of the trough onto the distributing structures 41, 42. Whilst trickling down over these distributing structures, the condensate evaporates into the admixed indifferent gas and passes from the evaporation surfaces through diffusion through the indifferent gas directly over to the surfaces situated opposite, on which absorption liquid trickles down. Here the evaporated working medium is absorbed and the absorption solution, which is thereby more and more enriched, gathers at the bottom of the intermediate space in the store 43 from where it passes through the pipes 44, 45, 46 to the generator 48.

The quantity of neutral gas in the intermediate space is to be so chosen that the total pressure in the intermediate space 38 differs as little as possible from the atmospheric pressure. It is therefore unnecessary to so design the apparatus as to make it capable of withstanding high differences in pressure. The part of the difference of pressure between the condensing and evaporating pressures of the medium operating in the plant, not equalized by the indifferent gas, is maintained by the liquid columns formed by the condensate in the condenser 52 and the pipe 58 joined to same, and by the rich absorption solution in the liquid pipe 46. Instead of this it would of course be possible to use a pump for the rich solution, and regulating valves for the rest. As a working medium, ethyl chloride can be employed to advantage and as a solvent tetrachloroethane.

The arrangement described in the last place may also be operated in such a manner as to be suitable for keeping warm or heating the space 31 surrounded by the walls 34 and 36. For this purpose only a small alteration is necessary, consisting in exchanging the evaporation and absorption surfaces by conveying to the trough 56 the condensate and to the trough 59 the weak absorption solution coming from the gas separation chamber 50. By arranging the pipes 55 and 56 so that they pass through a common four-way cock, the plant can even be operated in such a manner that the space 31 is according to requirements at different times heated or kept cold. To pass from one manner of operation to the other it is only necessary to change over the four-way cock.

I claim as my invention:

1. An arrangement for reducing the transmission of heat between two spaces of different temperatures, containing two walls enclosing an intermediate space, said walls and said intermediate space separating said two spaces of different temperatures, and a continuous absorption machine, the one of the two sides of said walls which face the intermediate space being adapted to act as an evaporation surface and the other as an absorption surface for the working medium of said absorption machine, said intermediate space containing a neutral gas to equalize partially the difference of pressure between the pressure of the vapor of the evaporating working medium on the one hand and of the separated and condensing working medium on the other hand, the remainder of the said difference of pressure being maintained by liquid columns.

2. An arrangement for reducing the transmission of heat between two spaces of different temperatures, containing two walls enclosing an intermediate space, said walls and said intermediate space separating said two spaces of different temperatures, and a continuous absorption machine, the one of the two sides of said walls which face the intermediate space being adapted to act as an evaporation surface and the other as an absorption surface for the working medium of said absorption machine, the pressure of the vapor of said working medium being such that the pressure in said intermediate space is substantially equal to the pressure of the surrounding atmosphere.

3. An arrangement for reducing the transmission of heat between two spaces of different temperatures, containing two walls enclosing an intermediate space, said walls and said intermediate space separating said two spaces of different temperatures, and a continuous absorption machine, the one of the two sides of said walls which face the intermediate space being adapted to act as an evaporation surface and the other as an absorption surface for the working medium of said absorption machine, said intermediate space containing a neutral gas to equalize partially the difference of pressure between the pressure of the vapor of the evaporating working medium on the one hand and of the separated and condensing working medium on the other hand, the remainder of the difference of pressure being maintained by liquid columns, said neutral gas being admixed in such quantities that in said intermediate space substantially a pressure exists equal to the pressure of the surrounding atmosphere.

4. An arrangement for reducing the transmission of heat between two spaces of different temperatures, containing two walls enclosing an intermediate space, said walls and said intermediate space separating said two spaces of different temperatures, and a continuous absorption machine, the one of the two sides of said walls which face the intermediate space being adapted to act as an evaporation surface and the other as an absorption surface for the working medium of said absorption machine, said intermediate space containing a neutral gas to equalize partially the difference of pressure between the pressure of the vapor of the evaporating working medium on the one hand and of the separated and condensing working medium on the other hand, the remainder of the said difference of pressure being maintained by liquid columns, said neutral gas having a molecular weight so much heavier than the molecular weight of said working medium that at a given total pressure practically no circulation of gas exists in the intermediate space.

5. An arrangement for reducing the transmission of heat between two spaces of different temperatures, containing two walls enclosing an intermediate space, said intermediate space separating said two spaces of different temperatures, and a continuous absorption machine, one of the sides of said walls which face the intermediate space being adapted to act as an evaporation surface and the other as an absorption surface for the working medium of said absorption machine, said intermediate space containing a neutral gas to equalize to some extent the difference in pressure between the pressure of the vapor of the evaporating working medium on the one hand and of the separated and condensing working medium on the other hand, said neutral gas having a molecular weight so selected with respect to the molecular weight of said working medium that at a given total pressure practically no circulation of gas exists in the intermediate space.

6. In a continuous absorption refrigerating apparatus of the type in which a neutral gas is employed, a diffusion chamber, a neutral gas confined therein, means for supplying a refrigerant and an absorbent for the refrigerant to said chamber and for causing the refrigerant and absorbent to flow over spaced surfaces in said chamber so that the refrigerant may evaporate on one surface to cool the same and diffuse through the neutral gas to be absorbed by the absorbent at a higher temperature on another surface thereof, said neutral gas having a molecular weight so selected with respect to the molecular weight of said working medium that at a given total pressure practically no circulation of gas exists in the intermediate space, whereby the diffusion space containing the neutral gas also serves as a heat insulating medium between the evaporation surface and the absorption surface.

7. In a continuous absorption refrigerating machine comprising a generator, a condenser or liquefier, a common evaporation and absorption chamber, said chamber containing a neutral gas through which the working-medium vapor passes over to the absorption liquor substantially only through diffusion, said gas being admixed to the working-medium vapor only in such a small quantity that the total pressure of the mixture of neutral gas and working medium vapor remains low compared to the vapor pressure of the working medium alone measured at the normal temperature of evaporation.

8. In a continuous absorption refrigerating machine comprising a generator, a condenser or liquefier, a common evaporation and absorption chamber, said chamber containing a neutral gas through which the working medium vapor passes over to the absorption liquor substantially only through diffusion, said gas being admixed to the working medium vapor only in such a small quantity that the total pressure of the mixture of neutral gas and working medium vapor remains low compared to the vapor pressure of the working medium alone measured at the normal temperature of evaporation, and liquid columns for maintaining the difference of pressure existing between the diffusion chamber on the one hand and the generator and liquefier on the other hand.

9. In a continuous absorption refrigerating machine comprising a generator, a condenser or liquefier, a common evaporation and absorption chamber, said chamber containing a neutral gas through which the working medium vapor passes over to the absorption liquor substantially only through diffusion, said gas being admixed to the working medium vapor only in such a small quantity that the total pressure of the mixture of neutral gas and working medium vapor remains low compared to the vapor pressure of the working medium alone measured at the normal temperature of evaporation, and liquid columns for maintaining the difference of pressure existing between the diffusion chamber on the one hand and the generator and liquefier on the other hand, and pipes for connecting said diffusion chamber with said generator to form a circulating system for the absorption liquor, said circulating system containing an upwardly extending pipe for lifting the absorption liquor by means of vapor bubbles developed in said generator.

10. In a continuous absorption refrigerating machine, the combination of a generator, a condenser, a combined absorber-evaporator and means connecting said parts and co-operating therewith to provide an arrangement so constituted that when a refrigerant, an absorption liquid and an inert gas are placed therein, the total pressure in the absorber-evaporator will be less than the total pressure in the condenser and the refrigerant partial pressure in the absorber-evaporator will be less than the total pressure in the absorber-evaporator.

11. In a continuous absorption refrigerating machine, the combination of a generator, a condenser, a combined absorber-evaporator and means connecting said parts and co-operating therewith to provide an arrangement so constituted that when a refrigerant, an absorption liquid and an inert gas are placed therein, the total pressure in the absorber-evaporator will be less than the total pressure in the condenser and the refrigerant partial pressure in the absorber-evaporator will be less than the total pressure in the absorber-evaporator, the difference in total pressure between the condenser and absorber-evaporator being due to the formation of liquid columns in certain of said conduits.

In testimony whereof I affix my signature.
EDMUND ALTENKIRCH.